United States Patent [19]

Koumal

[11] Patent Number: 5,286,427
[45] Date of Patent: Feb. 15, 1994

[54] METHOD OF ENVIRONMENTAL CLEANUP AND PRODUCING BUILDING MATERIAL USING COPPER MINE TAILINGS WASTE MATERIAL

[76] Inventor: George Koumal, 4750 N. Oracle Rd., Ste. 214, Tucson, Ariz. 85705

[21] Appl. No.: 1,568

[22] Filed: Jan. 6, 1993

[51] Int. Cl.[5] .......................... B28B 1/14; B28B 1/50; B28B 7/10; B28B 11/12
[52] U.S. Cl. ................................ 264/40.1; 106/641; 106/672; 106/697; 106/737; 106/745; 106/796; 106/797; 106/122; 264/42; 264/157; 264/163; 264/277; 264/279; 264/297.9; 264/333; 264/336; 264/DIG. 69
[58] Field of Search .................. 264/40.1, 333, 122, 264/157, 163, 42, DIG. 69, 336, 297.9, 277, 279, 279.1; 106/737, 697, 641, 672, 122, 796, 797, 745

[56] References Cited

U.S. PATENT DOCUMENTS

| | | | |
|---|---|---|---|
| 2,716,070 | 8/1955 | Seipt | 106/672 |
| 2,880,100 | 3/1959 | Torsten | 106/672 |
| 2,880,101 | 3/1959 | Torsten | 106/672 |
| 2,900,109 | 8/1959 | Hoopes et al. | 264/DIG. 65 |
| 3,442,498 | 5/1969 | Davis | 106/697 |
| 4,041,670 | 8/1977 | Kaplan | 52/591 |
| 4,116,705 | 9/1978 | Chappell | 210/751 X |
| 4,208,217 | 6/1980 | Anderson et al. | 106/697 X |
| 4,329,178 | 5/1982 | Kalvenes et al. | 106/724 |
| 4,376,086 | 3/1983 | Schubert et al. | 106/672 X |
| 4,422,989 | 12/1983 | Hums et al. | 106/672 X |
| 4,673,659 | 6/1987 | Wood et al. | 106/737 X |
| 4,741,776 | 5/1988 | Bye et al. | 106/713 X |
| 4,756,761 | 7/1988 | Philip et al. | 106/714 |

FOREIGN PATENT DOCUMENTS

| | | | |
|---|---|---|---|
| 0104625 | 9/1978 | Japan | 106/737 |
| 0777013 | 11/1980 | U.S.S.R. | 106/672 |
| 0833682 | 5/1981 | U.S.S.R. | 106/737 |
| 0975635 | 11/1982 | U.S.S.R. | 106/737 |

OTHER PUBLICATIONS

Siporex Technical Data Booklet, Author and date published unknown.

Primary Examiner—Karen Aftergut
Attorney, Agent, or Firm—Victor Flores

[57] ABSTRACT

A method of environmental cleanup by producing an autoclaved aerated cement building material (termed AAC) by a process that uses the available silica sand and other raw materials in mine tailings, in particular copper mine tailings from porphyry copper mines. The process minimizes the need for processed silica sand and other raw materials, normally used in the production of the AAC building material. The lightweight AAC building material produced from the mine tailings has excellent thermal insulation properties, sound absorption and other desirable construction qualities comparable to AAC building material produced using processed silica sand, i.e. from non-mine tailings raw material sources. The utilization of the copper mine tailings for producing the AAC building material, not only rids the countryside of the blight of the mountains of mine tailings waste material, but also preserves the natural resources by using the available silica, lime and other contained elements, and further conserves energy because the silica in the mine tailings is already previously ground to the desired gradation by the mining process. Further, since the AAC is a substitute for lumber, the forests as a natural resource, are preserved.

14 Claims, 2 Drawing Sheets

METHOD OF ENVIRONMENTAL CLEANUP AND PRODUCING BUILDING MATERIAL USING COPPER MINE TAILINGS WASTE MATERIAL

FIELD OF THE INVENTION

The present invention relates to environmental cleanup and building materials. More particularly, the present invention relates to building material that is formed by a process of combining materials such as sand, cement and other aggregate material that complement each other to bond into a desired building structure, such as building blocks, prefab walls, and the like. Even more particularly, the present invention relates to processes and resulting building products that salvage and utilize waste material to produce building material and aid in cleaning up the environment.

BACKGROUND OF THE INVENTION

The construction industry requires the massive exploitation of natural resources such as limestone, sand, gravel, gypsum and lumber. The materials are found, almost without exception, in every single edifice or man made structure in the United States. By example, a lightweight construction material, known generically as autoclaved aerated concrete, also known by the acronym AAC, uses the same basic ingredients as in concrete, but in addition, also comprise aluminum powder. The AAC building material requires the mining of silica ($SiO_2$) as the main raw material. The silica is in a coarse state and requires being ground and sieved for utilization as in the production process of the AAC. The preparation of the silica sand for utilization obviously requires expending a substantial amount of energy which further depletes natural resources and adds to the cost of the building material. The construction industry further depletes the forests by requiring huge amounts of lumber in the construction of buildings and residential housing. The AAC is known to replace the need for lumber as a basic structural element. Other material, such as lime, must be added to produce the AAC product.

While the building material industry depletes natural resources such as limestone, sand and gravel, the mining industry is creating waste materials in the form of mine tailings. In particular, in the State of Arizona, there are mountains of waste material containing billions of tons of copper mine tailings. The Arizona copper mines that produce the waste material are porphyry copper mines, where traditionally the host copper containing rock is predominantly silica ($SiO_2$). The average composition of the porphyry copper mine tailings in Arizona, in weight percentage, has been found to consist of:

Silica Sand ($SiO_2$): 61%
Lime (CaO): 12%
Aluminum Oxide ($Al_2O_3$): 7%
Ferrous Oxide ($Fe_2O_3$): 7%
Pyrite ($FeS_2$): 3%
Magnesium Oxide (MgO): 1%
Potassium Oxide ($K_2O$): 2%
Sodium Oxide ($Na_2O$): trace
Sulfur (S) trace The composition analysis of the Arizona copper mine tailings shows that silica sand is in fact found in substantial amounts. Also, and a very important characteristic, the silica is found in a granular state that is substantially equivalent to the granular state to which the silica must be ground and sieved to produce the AAC lightweight building material. The fine granular state of the silica sand in the mine tailings results from a flotation process that produces copper from pulverized copper ore. Similarly, lime is found in substantial amounts in the copper mine tailings. While, no particular data is presently available, mine tailings from other metal ore mines conceivably also contain comparable amounts of silica sand and lime in their mine tailings, especially if the host rock for the other metals is porphyritic.

Although the composition analysis of the copper mine tailings shows that silica sand, and lime is readily available, there are no known processes for producing building structural material that have capitalized on the availability of the silica and other of the contained elements in the waste material resource. The mine tailings from metal ore mines, especially the Arizona copper mine tailing, are not being utilized for any useful purpose and are contributing to a form of pollution of the environment. Present day environmental concerns will eventually require cleanup of the copper mine tailings, and other metal ore mining tailings. The utilization of the copper mine tailings, for example, when used to produce the AAC building material, would not only rid the blight of the mountains of mine tailings, but would also preserve the natural resources by using the available silica, lime and other contained elements, and conserve energy by virtue that the silica in the mine tailings does not require the expending of energy to arrive at the desired material gradation for use as a processed silica sand substitute. Further, since the AAC is a substitute for lumber, the forests as a natural resource, would also be preserved.

Thus, a need is seen to exist for a building product produced by a process that minimizes the need for natural resources, conserves on energy, and that uses the mine tailings from mining to effect environmental cleanup.

A particular need is seen to exist for a building material produced by a process that minimizes the need for natural resources used in the building material, that conserves on energy, and that uses copper mine tailings in the production of the building material to effect environmental cleanup.

A more particular need is seen to exist for a building material produced by a process that minimizes the need for processed silica sand and other raw materials by using the available silica sand and other raw materials found in copper mine tailings to effect environmental cleanup.

SUMMARY OF THE INVENTION:

Accordingly, the primary object of the present invention is to provide a building material produced by a process that minimizes the need for natural resources used in the building material, that conserves on energy, and that uses copper mine tailings in the production of the building material to effect environmental cleanup.

A more particular object of the present invention is to provide a building material produced by a process that minimizes the need for processed silica sand and other raw materials by using the available silica sand and other raw materials found in copper mine tailings to effect environmental cleanup.

Another object of the present invention is to provide a building material, such as AAC, produced by a process that includes a combination of known prior art process steps and new process steps that factor the utilization of available silica sand and other raw materials found in copper mine tailings.

A related object of the present invention is to produce a building structural material having a composition that primarily consists of mine tailings waste material and which has physical properties and end-use applications equivalent to a similar building material produced from non-mine tailings raw materials.

The foregoing objects are accomplished by providing facilities for producing the building structural material; providing raw materials for producing the building structural material, the raw materials comprising a processed silica sand substitute in the form of mine tailings waste material, cement, and aluminum powder, the mine tailings having a material gradation suitable for immediate use, analyzing the provided mine tailings to determine its composition and associated included weight percentage amounts of other ones of the provided raw materials, preparing a slurry from the provided mine tailings; combining the slurry with other of the provided raw materials to form a batch slurry; adjusting amounts of the other provided raw materials in accordance with the determined weight percentage amounts in the mine tailings; and processing the batch slurry through the provided facilities including a final curing step that produces the building structural material.

Therefore, to the accomplishments of the foregoing objects, the invention consists of the foregoing process steps and features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
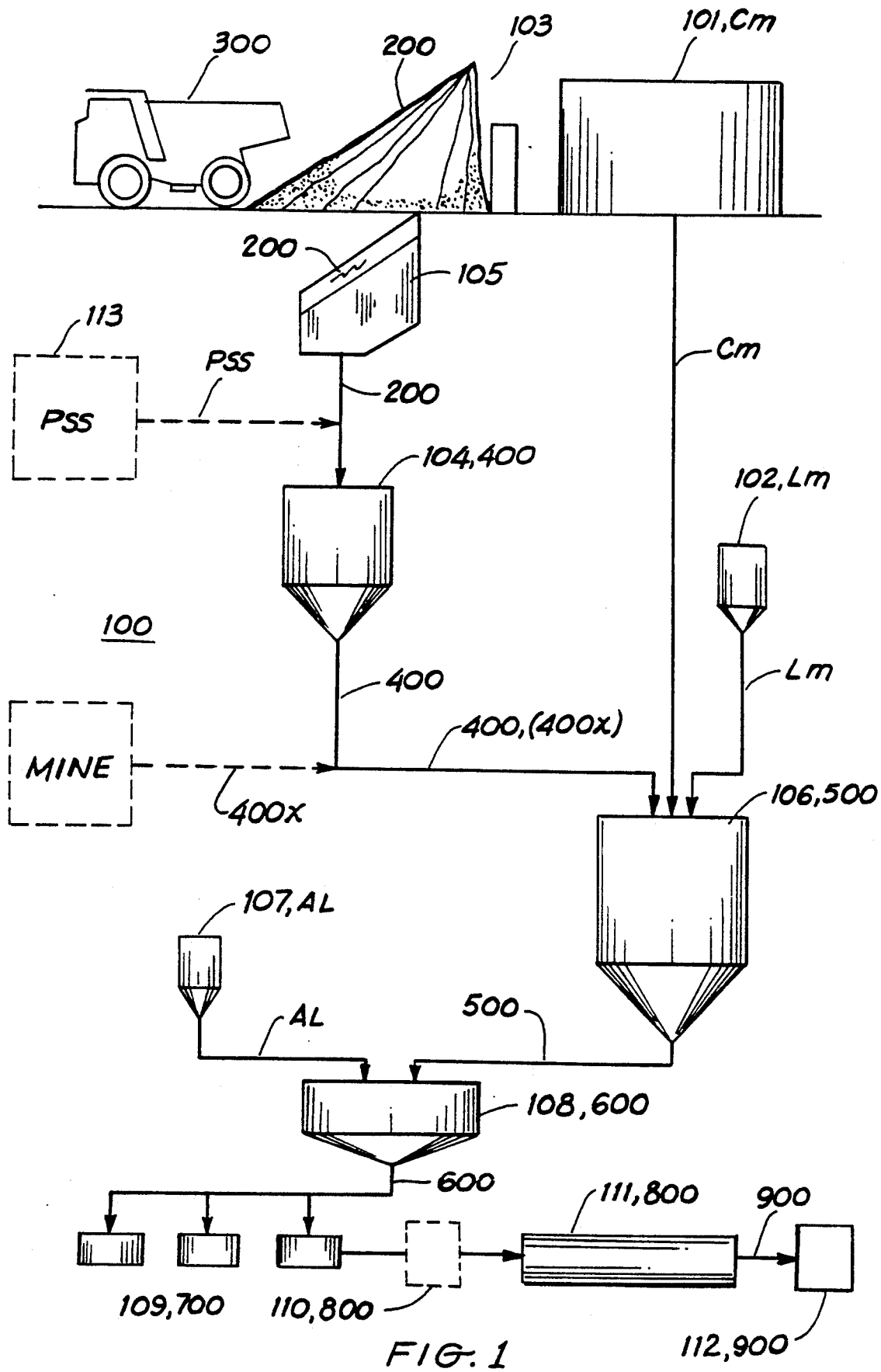
FIG. 1 is a suggested layout of a facility for utilizing mine tailing for producing autoclaved aerated cement (AAC) building material, in accordance with the present invention, including a formed stockpile of the mine tailings and an alternate source of the slurry containing mine tailings from a nearby mine site, and a measuring station for compensating the batch mixture in accordance with the amounts of other raw materials contained in the mine tailings.

Referring now to FIG. 1 where facilities 100 is a layout of equipment for producing, by example, the autoclaved aerated cement (AAC) building structural material 900, in accordance with the present invention. Facilities 100 comprises several storage means for storing raw materials, including a first bin 101 for storing cement Cm, a second bin 102 for storing chemical ingredients, such as lime Lm, and stockpile area 103 for storing mine tailings 200, which, by example, may be delivered to facilities 100 from a nearby copper mine site (not shown) by a material transport vehicle 300. As a backup precaution in the facilities layout, a storage bin 113 is provided for storing processed silica sand PSS for use as required, either because the silica sand content, in weight percentage, of the mine tailings is too low or to maintain production in the event of equipment failure in the flow of the mine tailings. Facilities 100 also includes a first mixing means 104 for receiving mine tailings 200 contained in hopper 105 for producing a slurry 400. Note that if the silica sand content in the mine tailings 200 is too low, the processed silica sand PSS may be added at this stage. FIG. 1 also shows an alternative source of slurry 400X, which may be directly provided, by example from a remote copper mine site MINE. The facilities 100 further includes a measuring means 106 for determining the proper proportions of cement Cm and the other chemicals, such as lime Lm, which needs to be mixed with the slurry product 400. The measurement at means 106 (and also at mixing means 104 where the silica sand is added) being in accordance with a batch composition analysis performed on mine tailings 200 at a nearby laboratory (not shown). The measured raw materials yields a first batch 500 which is mixed in a second mixing means 108 with aluminum powder AL contained in bin 107 to yield a production batch mixture 600. Facilities 100 includes an inventory of molds 109 which are of various geometric designs, (depending upon the end-use application of the building material, e.g. building blocks 900B, prefab wall panels 900W, roof tiles 900RT, roof panels 900RP, reinforced steel wall panels 900RS, see generally FIGS. 2, 3, and 5), for casting the production batch 600. Because of the chemical reaction that takes place in the casting stage, the production batch 600 changes from a fluid form to a quasi-solid form 700 of the building material. The quasi-solid form 700 expands and conforms to the mold shape and facilitates being cut to smaller unit 800 of the building material, by example in a cutting room 110. As a final step in the process, the cut units 800 are directed to autoclave ovens 111 for steam curing to produce AAC building structural material 900 in accordance with the present invention. The cured AAC building material 900 is stored in storage warehouse 112 for subsequent delivery to the construction industry.

In the utilization of the mine tailings, periodic composition analysis are performed to determine the silica sand content, the lime content, as well as the metallic sulfides content. The analysis results include the weight percentage amounts of similar ones of the provided raw materials so that the necessary material adjustment can be made in mixing bin 104, or at measuring station 106.

Although the metallic sulfides are present in the copper mine tailings in minute quantities, their potential threat to the environment should not be taken for granted and should be monitored during the composition analysis of the mine tailings. It should be noted, however, that the process for producing the AAC building material thoroughly encapsulates any sulfide present, thereby insulating them from the possibility of being leached out of the end product by the effects of weathering.

It is believed important to restate that because the silica in the mine tailings, especially the copper mine tailings, have a material gradation comparable to processed silica sand, the energy required to grind and sieve the raw silica is eliminated. This makes, for example, the Arizona copper mine tailings especially attractive for producing the AAC building material, since the silica sand is available for immediate use.

Figure 2:
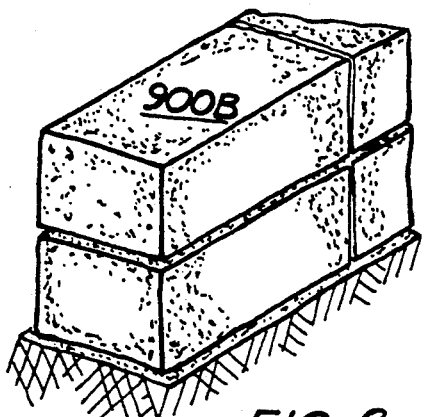
FIG. 2 shows building material in the form of an AAC building block which can be produced from mine tailings.
Figure 3:
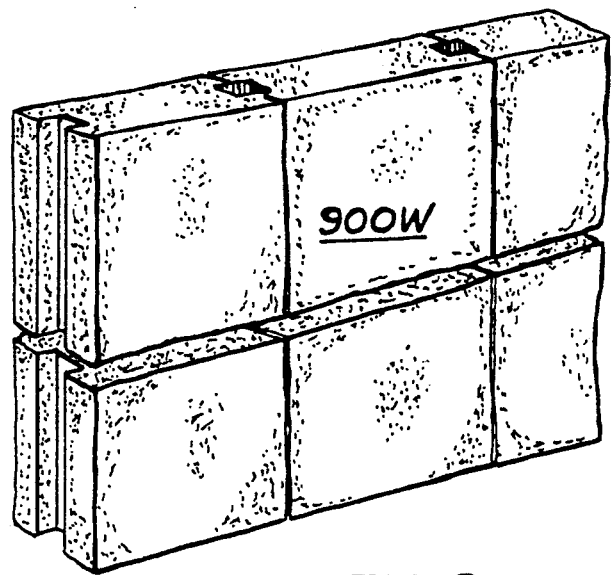
FIG. 3 shows building material in the form of an AAC wall panel which can be produced from mine tailings.
Figure 5:
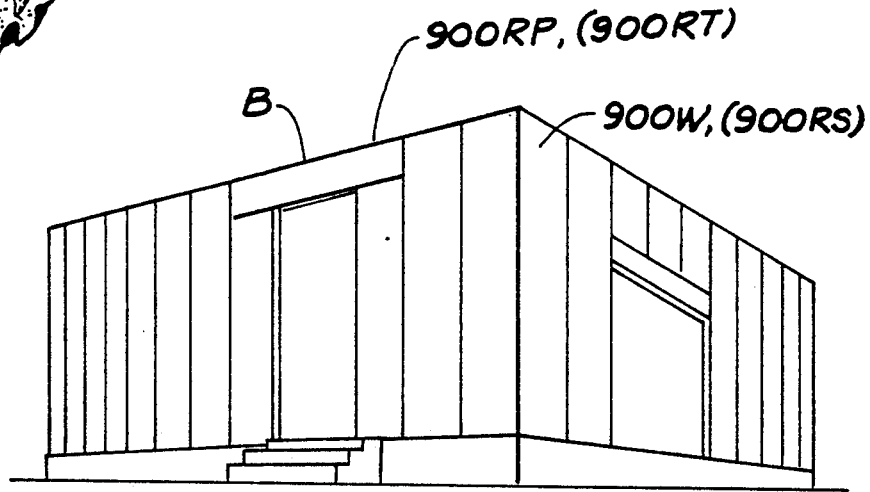
FIG. 5 shows a partially erected building constructed from wall panels (or alternative reinforced steel wall panels), roof panels (or alternative roof tiles) all of which can be produced from mine tailings and the AAC building process in accordance with the present invention.

Facilities 100 process the batch slurry 600 through appropriate molds 109 where a controlled chemical reaction takes place. The molds 109 may take the form of a solid large block which may be cut into smaller blocks 900B, as shown in FIG. 2. The molds 109 may also be of a thinner design for producing a wall panel such as wall panel 900W shown in FIG. 3. If for structural reasons rebar is required for producing a reinforced building material 900RS, rods of rebar steel (not shown) may be positioned in the mold 109 prior to receiving the fluid slurry 600. Building B shown in FIG. 5 shows the walls comprising wall panels 900W, or possibly reinforced wall panels 900RS. Also, the design of molds 109 may be adapted to produce small roof tile 900RT, or large roof panels 900RP, generally indicated as part of building B in FIG. 5. The use of AAC roof panels is an example of a substitute for lumber, where wood trusses are typically used in the construction industry.

Figure 4:
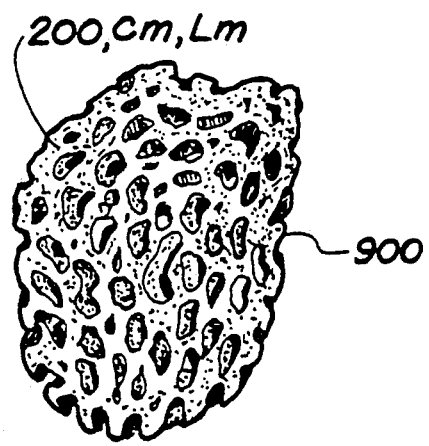
FIG. 4 shows an enlarged portion of the AAC building material produced from copper mine tailing, illustrating the expanded mass internal structure characteristic of AAC building material.

During the chemical reaction, which begins at mixing means 108 and concludes in molds 109, hydrogen gas is produced and is liberated causing the mass to expand to form closed spherical cells that give the AAC material 900 its lightweight physical properties, see generally FIG. 4. The desired shape of the lightweight AAC product is determined prior to hardening, for example cut into small blocks 900B in FIG. 2, and then is steam cured in autoclaves 111 to yield the final AAC building material 900 having stable, inert properties. Among the desirable physical properties which the foregoing process maintains in producing the ACC building material are: a thermal insulation factor of at least 1.00 R/inch of thickness, and a weight in the range of 400 to 600 kg per cubic meter. Other physical properties such as low compression strength (approximately 3.5 MPa), excellent sound absorption, incombustibility, and low coefficient of thermal expansion i.e. frost resistancy, are also noteworthy physical properties maintained by the alternate method of producing the autoclaved aerated cement (AAC) material.

From the foregoing, it is apparent that the construction industry is provided with a new source of building material without a need to exploit the natural resources, and a means of conserving on energy, and the mining industry, and more importantly the country, is provided with a means of cleaning up the environment by using the heretofore termed "mine tailing waste material".

Therefore, while the present invention has been shown and described herein in what is believed to be the most practical and preferred embodiment, it is recognized that departures can be made therefrom within the scope of the invention, which scope is therefore not to be limited to the details disclosed herein but is to be accorded the full scope of the claims so as to embrace any and all equivalent apparatus.

I claim:

1. A method of producing structural building products from autoclaved aerated concrete building material wherein mine tailings waste material remaining at a mine site is used as a processed silica sand substitute raw material during formation of said autoclaved aerated concrete building material from raw materials, said mine tailings comprising a plurality of autoclaved aerated concrete ingredients, including silica and lime, used in producing said autoclaved aerated concrete building material, said method comprising the steps of:
   (a) providing facilities for producing said autoclaved aerated concrete building material and said structural building products therefrom;
   (b) providing said mine tailings at said facilities from said mine site for use as said processed silica sand substitute raw material in said process for producing said autoclaved aerated concrete building material;
   (c) performing an analysis on said provided mine tailings to determine a composition thereof including weight percentage amounts of materials therein, including autoclaved aerated concrete ingredients, and to determine whether adjustments are needed during said production of said autoclaved aerated concrete building material with respect to weight percentage amounts of autoclaved aerated concrete ingredients required for formation of said autoclaved aerated concrete building material, dependent upon said determined composition of said provided mine tailings, including determining whether adjustments are needed for silica and lime ingredients required for said autoclaved aerated concrete building material;
   (d) processing said provided mine tailings with other raw materials comprising autoclaved aerated concrete ingredients to form a batch slurry having said required weight percentage amounts of said autoclaved aerated concrete ingredients, including adjusting amounts of said other raw materials to provide said required weight percentage amounts of said autoclaved aerated concrete ingredients dependent upon said determined composition of said provided mine tailings, in accordance with results determined from step (c), and mixing aluminum powder with said batch slurry to yield a production batch mixture;
   (e) pouring said production batch mixture into provided molds and forming uncured autoclaved aerated concrete building material; and
   (f) removing said formed uncured autoclaved aerated concrete building material from said molds and curing in provided autoclaved ovens to produce said structural building products from said autoclaved aerated concrete building material.

2. A method of producing structural building products from autoclaved aerated concrete building material as described in claim 1, wherein:
   said mine tailings waste material comprises copper mine tailings waste material.

3. A method of producing structural building products from autoclaved aerated concrete building material as described in claim 1, wherein:
   said composition of said mine tailings comprises at least forty percent by weight silica.

4. A method of producing structural building products from autoclaved aerated concrete building material as described in claim 1, wherein:
   said composition of said mine tailings comprises at least one percent by weight lime.

5. A method of producing structural building products from autoclaved aerated concrete building material wherein copper mine tailings waste material remaining at a copper mine site is used as a processed silica sand substitute raw material during formation of said autoclaved aerated concrete building material from raw materials, said mine tailings comprising a plurality of autoclaved aerated concrete ingredients, including silica and lime, used in producing said autoclaved aerated concrete building material, said method comprising the steps of:

(a) providing facilities for producing said autoclaved aerated concrete building material and said structural building products therefrom;

(b) providing said mine tailings at said facilities from said copper mine site for use as said processed silica sand substitute raw material in said process for producing said autoclaved aerated concrete building material;

(c) performing an analysis on said provided mine tailings to determine a composition thereof including weight percentage amounts of materials therein including autoclaved aerated concrete ingredients, and to determine whether adjustments are needed during said production of said autoclaved aerated concrete building material with respect to weight percentage amounts of autoclaved aerated concrete ingredients required for formation of said autoclaved aerated concrete building material, dependent upon said determined composition of said provided mine tailings, including determining whether adjustments are needed for silica and lime ingredients required for said autoclaved aerated concrete building material;

(d) processing said provided mine tailings with other raw materials comprising autoclaved aerated concrete ingredients to form a batch slurry having said required weight percentage amounts of said autoclaved aerated concrete ingredients, including adjusting amounts of said other raw materials to provide said required weight percentage amounts of said autoclaved aerated concrete ingredients in said batch slurry dependent upon said determined composition of said provided mine tailings, in accordance with results determined from step (c), and mixing aluminum powder with said batch slurry to yield a production batch mixture;

(e) pouring said production batch mixture into provided molds and forming uncured autoclaved aerated concrete building material; and (f) removing said formed uncured autoclaved aerated concrete building material from said molds and curing in provided autoclaved ovens to produce said structural building products from said autoclaved aerated concrete building material.

6. A method of producing structural building products from autoclaved aerated concrete building material as described in claim 5, wherein:

said step (a) includes providing a mold having a first preselected geometric design for producing multiple units of said autoclaved aerated concrete building material, each unit of autoclaved aerated concrete building material being provided with a second preselected geometric design;

said steps (e) and (f) include pouring said production batch mixture into said provided mold having said first preselected geometric design, causing a chemical reaction, controlling said chemical reaction, causing said production batch mixture to form an expanded mass having evenly distributed spherical cells, said expanded mass conforming to said first preselected geometric design, allowing said expanded mass to harden to a state that facilitates removing and cutting, removing and cutting said hardened mass into said multiple units of said autoclaved aerated concrete building material, each unit being cut according to said second preselected geometric design, and curing said cut multiple units of said autoclaved aerated concrete building material for producing said structural building products.

7. A method of producing structural building products from autoclaved aerated concrete building material as described in claim 6, wherein:

said step (e) includes locating reinforced steel rods in said provided mold prior to pouring said production batch mixture into said provided mold, and said method including producing reinforced steel autoclaved aerated concrete structural building products.

8. A method of producing structural building products from autoclaved aerated concrete building material as described in claim 6, wherein:

said second preselected geometric design comprises a rectangular geometric design.

9. A method of producing structural building products from autoclaved aerated concrete building material as described in claim 6, wherein:

said second preselected geometric design comprises a rectangular geometric design for producing wall panels.

10. A method of producing structural building products from autoclaved aerated concrete building material as described in claim 6, wherein:

said second preselected geometric design comprises a geometric design for producing roof tiles.

11. A method of producing structural building products from autoclaved aerated concrete building material as described in claim 6, wherein:

said second preselected geometric design comprises a geometric design for producing roof panels.

12. A method of producing structural building products from autoclaved aerated concrete building material as described in claim 5, wherein:

said composition comprises at least forty percent by weight silica.

13. A method of producing structural building products from autoclaved aerated concrete building material as described in claim 5, wherein:

said composition comprises at least one percent by weight lime.

14. A method of producing structural building products from autoclaved aerated concrete building material as described in claim 5, wherein:

said step (a) of providing facilities comprises providing copper mine tailings waste material storage facilities, and measuring facilities for performing said step of adjusting said amounts of said other raw materials to provide said required weight percentage amounts of said autoclaved aerated concrete ingredients in said batch slurry dependent upon said determined composition of said provided mine tailings in step (d).

* * * * *